3,720,633
POLYVINYL ALCOHOL ADHESIVE COMPOSITION WITH HIGH WET TACK CONTAINING A BORON COMPOUND AND A CIS 1,2-POLYOL COMPOUND
Ralph F. Nickerson, West Springfield, Mass., assignor to Monsanto Company, St. Louis, Mo.
No Drawing. Original application Nov. 12, 1968, Ser. No. 775,170, now Patent No. 3,632,786. Divided and this application Apr. 21, 1971, Ser. No. 136,208
Int. Cl. B32b 27/04; C08b 25/02; C08d 9/06
U.S. Cl. 260—17.4 ST                                4 Claims

ABSTRACT OF THE DISCLOSURE

Disclosed herein is an adhesive composition with high wet tack, which comprises:

(A) a polyvinyl alcohol resin,
(B) a water soluble boron compound, and
(C) a polyol selected from the group consisting of cis 1,2-polyols and certain 1,3-polyols.

---

This application is a divisional application of application Ser. No. 775,170, filed Nov. 12, 1968 and now U.S. Pat. 3,632,786, issued Jan. 4, 1972.

BACKGROUND OF THE INVENTION

(1) Field of the invention

This invention relates to adhesive compositions. More particularly, this invention relates to polyvinyl alcohol based adhesive compositions having high wet tack, which adhesive compositions comprise:

(A) a polyvinyl alcohol resin,
(B) a water soluble boron compound, and
(C) a polyol selected from the group consisting of 1,2-polyols and 1,3-polyols.

(2) Description of the prior art

Polyvinyl alcohol based adhesives are well known in the prior art. As aqueous compositions having excellent adhesive properties polyvinyl alcohol adhesives find widespread use in bonding cellulosic and other porous materials. Thus, polyvinyl alcohol based adhesives are widely used in paper converting applications such as fiber board and box board laminating, corrugating operations, bag manufacturing and in many other applications such as wallboard joint compounds, wallpaper pastes, bookbinding operations, etc.

High speed gluing and laminating operations require adhesive compositions having a high degree of early wet tack. Wet tack may be defined as the ability of the adhesive to develop an initial bond in a short period of time, that is, less than 60 seconds, so as to bond the adherents together and hold them until the adhesive bond develops its full strength. Water soluble boron compounds are well known additives for polyvinyl alcohol adhesives in order to increase the wet tack of the adhesives as is discussed in detail in U.S. Pat. 3,135,648.

However, the use of suitable water soluble boron compounds in conjunction with polyvinyl alcohol adhesives (hereinafter referred to as borated polyvinyl alcohol) does increase wet tack but at the same time it causes a tendency of the adhesive composition to gel if the pH of the system goes above 5.5. As the pH of the polyvinyl alcohol/water soluble boron compound adhesive composition increases above 5.5, the whole adhesive mass thickens with a loss of tack and wetting ability and ultimately sets into a stubborn rubbery gel. This gel can cause major operational difficulties such as the setting up of an adhesive batch in the mixing kettle or in pipe lines, which results in loss of the adhesive batch and in expensive downtime.

In order to reduce the danger of gelling in borated polyvinyl alcohol adhesive compositions, it has been found expedient to use a strong water soluble acid such as hydrochloride acid, acetic acid, phosphoric acid, oxalic acid, etc., to maintain the pH of the system below 5.5. This approach gives rise to new problems in that this use of such acidic materials to control the pH of the system causes other difficulties in regard to their storage and handling. Thus, corrosion may occur where these acids attack the surfaces of the mixing vessels, pumps and the conduits which are in contact with the adhesive compositions. Such potential corrosion may also involve the adhesive application equipment, causing pitting of the application rolls, wiping blades and nip rolls, necessitating the continued replating or replacement of these parts.

Another disadvantage of using acidic materials in borated polyvinyl alcohol adhesives is that these materials attack the cellulosic substrate thereby weakening the very material that is to be bonded.

Thus, one uses minimal amounts of these strong acids for obvious reasons but a small surge of alkali can overcome the acid, raise the pH and cause thickening, loss of tack and wetting and ultimate gelling of the adhesive.

Thus, there exists in the art the need for high tack borated polyvinyl alcohol adhesive compositions which do not use strong acids to control the pH of the system.

The present invention surmounts these deficiencies by providing borated polyvinyl alcohol adhesive compositions without resorting to a strong acid to lower the pH of the system to prevent gelation of the adhesive.

SUMMARY OF THE INVENTION

The present invention relates to borated polyvinyl alcohol adhesive compositions having a high degree of wet tack which comprise:

(A) a polyvinyl alcohol resin,
(B) a water soluble boron compound, and
(C) a polyol selected from the group consisting of 1,2-polyols and 1,3-polyols.

The present invention solves problems previously encountered in the prior art by providing borated polyvinyl alcohol adhesive compositions without resorting to strong acids to maintain low pH in the system.

The present invention solves problems previously encountered in the prior art by obviating the need for a strong acid to lower the pH of the borated polyvinyl alcohol adhesive compositions and accordingly provides high wet tack adhesive compositions which reduce the danger of equipment corrosion, lessen the hazard to operators and protect cellulosic substrates.

It is an object of this invention to provide new adhesive compositions.

It is a further object of this invention to provide adhesive compositions with high wet tack and reduced tendency to cause corrosion to metal surfaces.

It is a further object of this invention to provide borated polyvinyl alcohol adhesive compositions of high wet tack but without the need for a strong acid to prevent gelation of the system.

DESCRIPTION OF THE PREFERRED EMBODIMENTS

The foregoing and other objects are achieved by adhesive compositions which comprise:

(A) a polyvinyl alcohol resin,
(B) a water soluble boron compound, and
(C) a polyol selected from the group consisting of 1,2-polyols and 1,3-polyols.

The polyvinyl alcohols used in the present invention are those partially and fully hydrolyzed materials which contain not more than 60% by weight of residual unhydrolyzed acetate groups, calculated as polyvinyl acetate. These polyvinyl alcohol materials have viscosities in the range of from 1.3 to 150 centipoises when measured as a 4% by weight aqueous solution at 20° C. These materials are well known to those skilled in the art and need no further description here.

The final choice of polyvinyl alcohol used will depend on the particular application and the ultimate adhesive properties desired. For example, fully hydrolyzed polyvinyl alcohols having a 4% aqueous solution viscosity of at least 35 centipoises would be used in fiber board and box board laminating and in corrugating applications where a much higher degree of water resistance is desired and where the application permits the cooking of the adhesive formulation. On the other hand, where cold water soluble adhesives are desired as in wallboard joint cements, wallpaper pastes, etc., one would use polyvinyl alcohol having an aqueous solution viscosity of less than 35 centipoises and a residual polyvinyl acetate content of from 10 to 40%.

For the purpose of the present invention a variety of water-soluble boron compound may be employed. Examples of some suitable water-soluble boron compounds are borax, sodium metaborate, sodium pentaborate, boric acid, disodium octaborate tetrahydrate, boric oxide, etc.

Especially preferred boron compounds are boric acid and partially neutralized borate salts especially those with a low degree of neutralization. The amount of water-soluble boron compound to be employed will depend to some extent on the application for which the adhesive is to be used and upon the form of boron compound which is employed. In general from 2 to 30% parts by weight of the water soluble boron compound, per hundred parts of the polyvinyl alcohol, is used in the practice of the present invention. More preferably, one would use from 4 to 15% parts by weight of the water-soluble boron compound per hundred parts of the polyvinyl alcohol. However, the maximum amount of the water-soluble boron compound used should not exceed 1.5% by weight, expressed as boric acid, based on the weight of the aqueous adhesive composition.

The polyols used are cis 1,2-polyols such as sorbitol, mannitol, glycerol, dulcitol, ethylene glycol, etc., and 1,3-polyols such as pentaerythritol, trimethylol ethane, trimethylol propane, trimethylol butane, etc. Especially preferred are sorbitol, mannitol and glycerol. Although polyvinyl alcohol may be classed as a polyol, the expression polyol as used in regard to the present invention refers to those classes of polyols referred to above.

The amount of the polyol component used in the polyvinyl alcohol adhesives of the present invention is in the range of from 2 to 40 parts per hundred parts polyvinyl alcohol resin (p.h.r.) More preferably from 5 to 25 parts of the polyol component is used per hundred parts of resin (p.h.r.). In the most preferred embodiment 10 to 20 parts of the polyol component are used per hundred parts of resin.

The water-soluble boron compound and the polyol used in the present invention may be in the form of dry powders or crystals or in solution form. The former is to be preferred in dry mix type adhesives.

The adhesive compositions described above can be used as is or in conjunction with various inert fillers or extenders. These extenders and fillers are well known to those skilled in the art. Examples of these materials include clay, especially kaolinite clays, dolomite, ground limestone, i.e., calcium carbonate, asbestos, mica, silica, talc, gypsum, etc.

In addition to lowering adhesive costs the inert fillers and extenders are useful for controlling adhesive viscosity and penetration of the adhesive into the substrate as well as promoting quick tack, i.e., setting of the adhesive bond.

The inert fillers or extenders can be present in amounts of from about 25 to about 200 parts by weight per hundred parts of polyvinyl alcohol.

Furthermore, the borated polyvinyl alcohol/polyol adhesives of the present invention may be further modified by incorporating therein from 0 to 160 parts by weight per hundred parts of polyvinyl alcohol of an additional binder material such as starch, dextrin and/or synthetic resins such as polyvinyl acetate resins, etc. Especially preferred additional binder materials are starch and polyvinyl acetate resins which may be used in the form of polyvinyl acetate emulsions or aqueous dispersions or in the form of spray-dried polyvinyl acetate powders. The latter form is to be preferred when the adhesive compositions are to be in the form of a dry mix adhesive.

The preferred polyvinyl acetate powders used in the adhesive compositions of this invention are the free-flowing, water dispersible powders obtained upon spray-drying aqueous emulsions of polyvinyl acetate according to the process of Morrison, U.S. Pat. 2,800,463 or Bray, U.S. Pats. 3,104,234 and 3,225,425 composition prepared in the examples set forth below.

The wet tack of the adhesive is determined by placing about two (2) grams of the adhesive on the middle finger, pressing the thumb and forefinger to the adhesive on the middle finger, and separating the middle finger and the forefinger from the thumb, thus stretching the adhesive. The degree of cohesion as judged by the legging or stringing of the adhesive and the sound produced as the adhesive separated were observed and a rating of from 0 to 100 was given to the adhesive. The adhesive having the least tack was one having the lowest value, while the adhesive having the most tack was the one having the highest value.

The quick tack of the adhesive compositions is also determined by applying a 1.0 mil coating of adhesive to a strip of white paper of the type commonly used in office duplicating equipment, laminating this immediately to another strip of the same type paper, rolling the laminate assembly with a 5 lb. rubber roller and then periodically delaminating the assembly by stripping one sheet of the paper from the other and noting the time to 100% paper failure.

The following examples are set forth in illustration of the present invention and should not be construed as a limitation thereof. All parts and precentages are by weight unless otherwise indicated.

EXAMPLE 1.—CONTROL

This example is set forth to illustrate the low initial tack of polyvinyl alcohol adhesives that do not contain water-soluble boron compounds.

Ten (10) parts of the polyvinyl alcohol resin having a 4% aqueous solution viscosity of 57 centipoises at 20° C. and a residual acetate content of less than 1.8% by weight are dry blended with 1.8 parts of sorbitol. This dry blend is then slurried in 88.2 parts of cold water and then cooked at 95° C. to effect solution of the resin. The resulting solution has a pH of 5.8 and relatively low wet tack when compared to those adhesive compositions described below which contain a water-soluble boron compound.

EXAMPLE 2

This example is set forth to illustrate that the presence of a small amount of a polyol in the boron compound containing polyvinyl alcohol adhesive will prevent gel formation and provide a high wet tack adhesive.

Example 1 is repeated here except that 1.2 parts of boric acid are dry blended in with the polyvinyl alcohol and sorbitol components. This blend is then slurried in 87.0 parts of water and cooked as in Example 1. Upon cooling, the adhesive composition is found to have a pH of 4.8 and high wet tack.

EXAMPLE 3

Example 2 is repeated here except that the amount of sorbitol is increased to 3.6 parts and the amount of water is decreased to 85.2 parts. The resulting adhesive, which has a pH of 4.4, is found to have high wet tack properties.

EXAMPLE 4

Example 3 is repeated here except that mannitol is substituted for the sorbitol used in Example 3. The resulting adhesive has a pH of 4.6 and high wet tack properties.

TABLE I

| Ingredients:[1] | Example | | | |
|---|---|---|---|---|
|  | 1 | 2 | 3 | 4 |
| Polyvinyl alcohol | 10 | 10 | 10 | 10 |
| Boric acid |  | 1.2 | 1.2 | 1.2 |
| Sorbitol | 1.8 | 1.8 | 3.6 |  |
| Mannitol |  |  |  | 3.6 |
| Water | 88.2 | 87 | 85.2 | 85.2 |
| pH | 5.8 | 4.8 | 4.4 | 4.6 |
| Wet tack | 27 | 75 | 70 | 70 |
| Quick tack (seconds)[2] | 70 | 50–55 | 50–55 | 50–55 |

[1] Parts by weight.
[2] Time to 100% paper failure.

The data in the foregoing Table I illustrate the superior adhesive compositions that are obtained when a water-soluble boron compound and a polyol are used in conjunction with the polyvinyl alcohol resins of the present invention.

The adhesive compositions prepared in Examples 2 to 4 above were used to laminate two sheets of 64 lb. kraft paper together using a 5 mil coating of adhesive. The adhesive compositions machined very well and provided an adhesive bond with high initial wet tack. The laminates were then dried overnight at room temperature and then were soaked for 48 hours in water at room temperature. The wet laminates were then subjected to delamination tests. In each sample the delamination was due to paper failure and not to deterioration of the glue line.

EXAMPLE 5.—CONTROL

This example is set forth as a control to illustrate the pronounced tendency of boron compound containing polyvinyl alcohol adhesives to gel unless the pH of the system is maintained below a pH of about 6.

Ten (10) parts of a fully hydrolyzed polyvinyl alcohol resin having a 4% aqueous solution viscosity of 57 centipoises at 20° C. and a residual acetate content of less than 1.8% by weight is dry blended with 1.2 parts of boric acid. This dry blend is then slurried in 88.8 parts of cold water and then cooked at 95° C. to effect solution of the resin. The resulting adhesive solution is found to have a pH of 5.5 and a wet tack rating of 75 and is generally comparable to the adhesive composition of Example 2 in physical properties.

Simulated alkali contamination of the adhesive compositions of Examples 2 and 5 was effected by introducing a 5% borax solution into each adhesive composition.

Fifty (50) ml. of borax solution per liter of aqueous adhesive composition are added to the polyol containing adhesive prepared in Example 2, with only a moderate increase in viscosity and with no loss of wet tack or wetting ability. Similar results were obtained with the aqueous adhesive compositions prepared in Examples 3 and 4.

On the other hand, one liter of the aqueous composition prepared in Control Example 5, which contains no polyol component, gels into a rubbery mass with loss of wet tack and wetting ability when only 10 ml. of the borax solution is added.

These experiments clearly indicate that aqueous adhesive compositions of the present invention are less susceptible to gelling when contaminated by alkali materials than similar compositions which do not contain a polyol component.

The following Examples 6 to 8 are set forth to further illustrate some of the variations that are possible within the scope of this invention. These examples are to be compared with Example 9 that does not contain a polyol compound in accordance with the practice of this invention. In each example the polyvinyl alcohol used is a fully hydrolyzed material having a residual acetate content of less than 2% and a 4% aqueous solution viscosity of 62 centipoises when measured at 20° C. The clay used is a kaolinite clay which is slightly alkaline in nature.

In each example the ingredients are dry blended and cooked as in Example I. Laminates are then prepared and tested as in Examples 3 to 5 above, and the results are tabulated in Table II below.

TABLE II.—SUMMARY OF EXAMPLES 6 TO 9

| Ingredients:[1] | Example | | | |
|---|---|---|---|---|
|  | 6 | 7 | 8 | 9 |
| Polyvinyl alcohol | 5.0 | 5.0 | 5.0 | 5.0 |
| Boric acid | 0.5 | 0.6 | 1.2 | 1.2 |
| Sorbitol | 1.5 | 0.6 | 1.2 |  |
| Clay | 15.0 | 15.0 | 15.0 | 15 |
| Water | 78.0 | 78.8 | 77.6 | 78.8 |
| pH | 4.9 | 4.9 | 4.7 | Gel |
| Wet tack | 77 | 82 | 76 | <10 |
| Quick tack[2] | 35–40 | 35–40 | 35–40 | ([3]) |

[1] Parts by weight.
[2] Seconds to 100% paper failure.
[3] Unable to test.

Examples 6 to 8 are fluid stable adhesives with excellent wet tack and quick tack. Example 9 which is prepared without using a polyol compound in accordance with the practice of this invention is an unusable gel.

EXAMPLE 10

This example is set forth to illustrate the use of an additional binder material in the adhesive formulations of the present invention. The following formulation is used in this example.

| | Parts by weight |
|---|---|
| Polyvinyl alcohol | 4.6 |
| Boric acid | 0.5 |
| Sorbitol | 0.5 |
| Clay | 11.2 |
| Pearl starch | 2.2 |
| Water | 81.0 |
| Parts total | 100.0 |

The polyvinyl alcohol used is the same as that used in Example 1 above. The dry ingredients are dry blended, slurried in cold water and then cooked as in Example 1. This adhesive composition is found to have a pH of 5.1, a wet tack rating of 78 and a quick tack rating of 30–35 second. Laminated fiber board made with this material is found to have excellent water resistance.

EXAMPLE 11

Example 10 is repeated here except that the pearl starch is replaced with a spray-dried polyvinyl acetate powder. The resulting adhesive composition is comparable to that obtained in Example 10.

The following Examples 12 to 16 are set forth to further illustrate the wide variation that can be made in the adhesive compositions of the present invention. In each example the ingredients are slurried in water and cooked as in Example 1. The resulting adhesive compositions are stable solutions with a high degree of wet tack and good adhesive properties. The compositions of these materials are outlined in the following Table III. The values in parenthesis indicate the parts by weight of the respective compounds per hundred parts by weight of the polyvinyl alcohol used, which is the same type of polyvinyl alcohol as was used in Example 1.

The polyvinyl acetate used is a spray dried dextrin stabilized material and the clay is of the kaolinite variety which is further identified as ASP-600 (a trademark of the Minerals and Chemicals—Phillipp Corp.). The amount of water used in each example is adjusted to give 1500 parts by weight of the aqueous adhesive composition.

TABLE III.—SUMMARY OF EXAMPLES 12 TO 16 ADHESIVE COMPOSITIONS

| Example | Boron compound | Polyol | Filler | Additional binder |
|---|---|---|---|---|
| 12 | Boric oxide (10) | Trimethylol propane (20) | | |
| 13 | Boric acid (16) | Glycerol (15) | Clay (100) | |
| 14 | Boric oxide (20) | Sorbitol (25) | | Pearl Starch (50). |
| 15 | Boric acid (20) | Glycerol (15) | | Polyvinyl acetate (50) |
| 16 | Boric acid (30) | Mannitol (40) | Clay (100) | Do. |

The ability of the polyols used in the present invention to prevent gelation of the borated adhesive compositions is quite unexpected especially when one considers that the pH of a 5% solution of a polyol, e.g., sorbitol is 6.3 which is essentially the same as the pH of distilled water.

The bland non-corrosive nature of these polyols makes them especially desirable and useful as additives in borated polyvinyl alcohol adhesive compositions.

Also contemplated for use in the practice of this invention are other adjuvants which are commonly used in adhesive formulators such as preservatives, fungicides, fluidizing agents, antifoam agents, viscosity regulators, humectants, plasticizers, solubilizing aids, pigments, dyes, odor masking compounds, etc.

From the foregoing it should be apparent that many modifications and variations may be made in the practice of the present invention without departing from the spirit and scope thereof.

What is claimed is:

1. A dry blended adhesive composition consisting essentially of:
   (A) 100 parts by weight of a polyvinyl alcohol having not more than 60% by weight of residual unhydrolyzed polyvinyl acetate groups and a 4% aqueous solution viscosity at 20° C. in the range of from 1.3 to 150 centipoises;
   (B) from 2 to 20 parts by weight of a water soluble boron compound selected from the group consisting of boric acid, boric oxide and borax;
   (C) from 2 to 40 parts by weight of a cis 1,2-polyol selected from the group consisting of sorbitol and mannitol;
   (D) from 25 to 200 parts by weight of an inert filler selected from the group consisting of clay, dolomite, calcium carbonate, asbestos, mica, silica, talc and gypsum; and
   (E) from 0 to 100 parts by weight of additional binder material selected from the group consisting of starch and dextrin.

2. The adhesive composition of claim 1 wherein the polyol is sorbitol, and the boron compound is boric acid.

3. The adhesive composition of claim 1, wherein the polyol is mannitol.

4. A dry blended adhesive composition consisting essentially of:
   (A) 100 parts by weight of a polyvinyl alcohol having not more than 60% by weight of residual unhydrolyzed polyvinyl acetate groups and a 4% aqueous solution viscosity at 20° C. in the range of from 1.3 to 150 centipoises;
   (B) from 2 to 20 parts by weight of boric acid;
   (C) from 2 to 40 parts by weight of a cis 1,2-polyol selected from the group consisting of sorbitol and mannitol;
   (D) from 25 to 200 parts by weight of clay; and
   (E) from 0 to 100 parts of additional binder material selected from the group consisting of starch and dextrin.

References Cited
UNITED STATES PATENTS

| 3,425,972 | 2/1969 | Nobile et al. | 260—17.4 ST |
| 3,600,342 | 8/1971 | Nickerson et al. | 260—17.4 ST |
| 3,632,786 | 1/1972 | Nickerson | 260—17.4 ST |

WILLIAM H. SHORT, Primary Examiner

E. WOODBERRY, Assistant Examiner

U.S. Cl. X.R.

106—210, 214; 161—250, 266; 260—33.4 R